(No Model.)
F. TREBAU.
SELF CLEANSING FILTER.
No. 368,629. Patented Aug. 23, 1887.
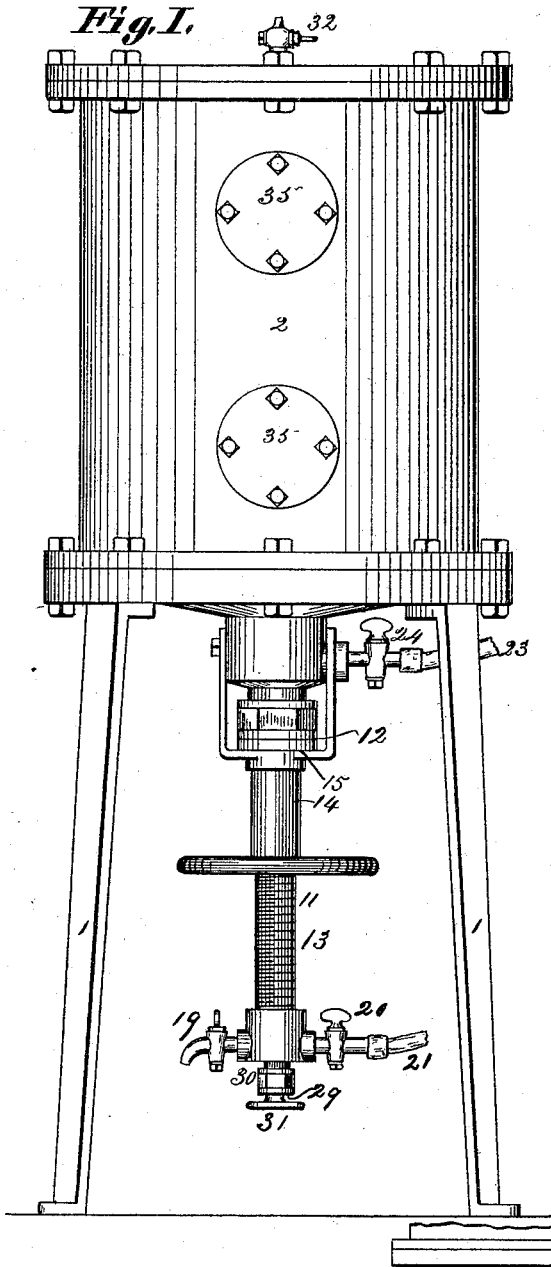
Fig. I.
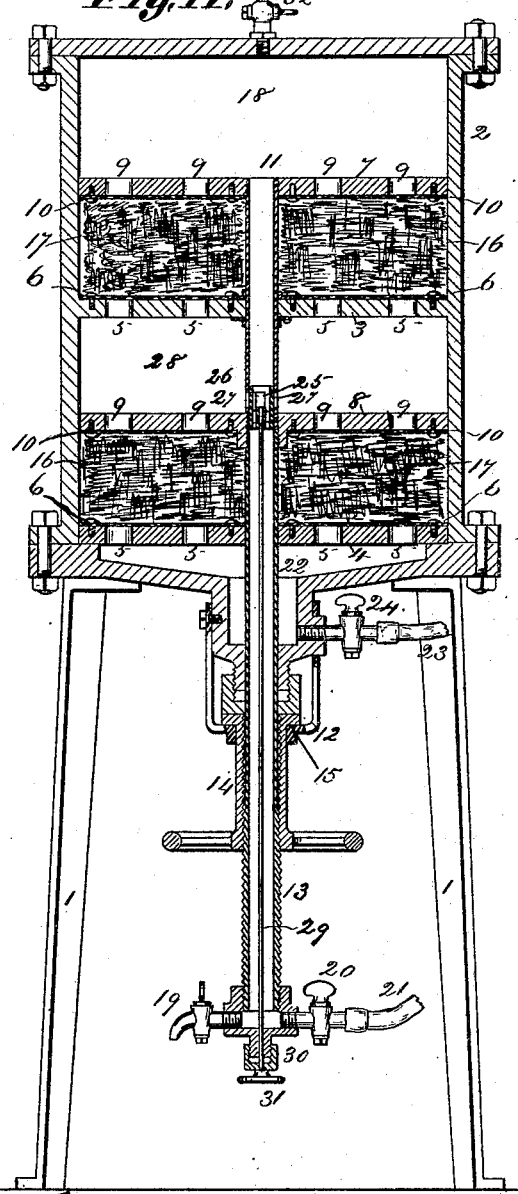
Fig. II.
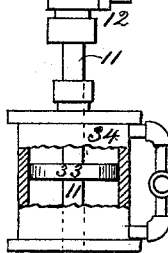
Fig. III.
Attest:
F. A. S. Hopkins
Emma Arthur
Inventor:
Frank Trebau.
By Knight Bros.
Attys.

UNITED STATES PATENT OFFICE.

FRANK TREBAU, OF ST. LOUIS, MISSOURI, ASSIGNOR OF ONE-HALF TO CLEMENS FISCHER, OF SAME PLACE.

SELF-CLEANSING FILTER.

SPECIFICATION forming part of Letters Patent No. 368,629, dated August 23, 1887.

Application filed March 7, 1887. Serial No. 230,017. (No model.)

*To all whom it may concern:*

Be it known that I, FRANK TREBAU, of the city of St. Louis, in the State of Missouri, have invented a certain new and useful Improvement in Self-Cleansing Filters, of which the following is a full, clear, and exact description, reference being had to the accompanying drawings, forming part of this specification.

This filter is intended for the filtering of liquids in general.

Figure I is a side elevation. Fig. II is an axial vertical section. Fig. III is a detail, partly in elevation and partly in section, showing a modification.

The apparatus may be supported in any suitable manner, either upon legs 1 or by other means.

2 is a cylinder or other vessel having diaphragms 3 and 4, which are similar in all respects, except as to position in the cylinder. These diaphragms have holes 5, through which the liquid passes downward. These holes are covered on the top by wire-gauze 6.

7 and 8 are circular plates or diaphragms, whose peripheries fit closely the inside of the cylinder, and which are movable therein, in the manner of a piston. These plates have holes 9 for the passage of liquid, similar to the holes in the diaphragms 3 and 4, and like them protected by gauze 10; but in this case the gauze is upon the under side. The plates 7 and 8 are fixed to the tube 11, which occupies the position of a piston-rod, and passes through a stuffing-box, 12, or cup-packing, at the lower end of the cylinder 2. The part of the tube 11 below the stuffing-box is screw-threaded, as seen at 13, Figs. I and II.

14 is a nut fitting the screw 13, and having bearing 15, which prevents its endwise movement, so that when it is turned the tube 11, and with it the plates 7 and 8, is moved vertically. The chambers 16, between the diaphragm 3 and plate 7, and between the diaphragm 4 and plate 8, are filled with sponge or some other porous material, 17, which will allow the passage of the liquid and arrest the gross particles. The material 17 should be of some compressible and expansible nature, so that it can be compressed by moving down the plates 7 and 8, thereby lessening the capacity of the chambers 16. The tube 11 is open at the upper end to the chamber 18 of the cylinder, and is closed at the lower end, except by the orifices closed by cocks 19 and 20. The cock 19 is simply a discharge-cock for occasional use when discharging the contents of the filter.

The liquid to be filtered enters through a pipe, 21, in communication with the cock 20, and passes up the tubular piston-rod to the upper chamber, 18, and down through the holes in the plates 7 and 8 and the diaphragms 3 and 4, and through the mass of porous material in the chambers 16 into the lower chamber, 22, of the cylinder. From the chamber 22 the purified liquid escapes through a pipe, 23, and cock 24.

25 is a cock having a tubular plug, through which the liquid passes upward when it is closed, as seen in Fig. II. The plug has side openings, 26, which are brought, by turning the plug, into connection with openings 27 in the sides of the tube 11, and when in this position the liquid escapes laterally into the middle chamber, 28, between the diaphragm 3 and the plate 8, and to reach the chamber 22 it is only necessary for the liquid to pass through the lower filtering-chamber. The cock 25 is turned by means of a stem, 29, which extends through a stuffing-box, 30, at the lower end of the tube 11.

31 is a hand-wheel secured to the lower end of the stem 29.

32 is a shifting-cock, allowing the escape of air from the cylinder when it is first put in operation.

When it is required to filter the liquid very perfectly, the plates 7 and 8 are drawn downward, compressing the porous material 17. When the liquid needs less thorough filtering, the plates 7 8 may be raised, allowing the expansion of the material 17.

In cleaning the filter the pipe 23 is connected with the water-main or with another water-supply, and the water under pressure allowed to flow in a reverse course through the filter, washing out the impurities. The cock 20 is now closed and the cock 19 opened, allowing the waste water to escape after passing upward through the cylinder and downward through the pipe 11. It is advantageous in the cleaning process to vary the pressure of the plates 7 8 upon the porous material, so as to squeeze the impurities out.

In the modification shown in Fig. III, the plates 7 8 are forced upward or downward by air or steam pressure acting upon a piston-head, 33, fast on the tube 11, working in an air or steam cylinder, 34, having any suitable arrangement to allow the compressed air or steam to enter one end of the cylinder and escape from the other.

I have described the filtering-vessel as a cylinder; but it may have any other shape.

I have described two diaphragms, 3, 4, and movable plates 7 8. There may be only one of each and only one of the chambers 16, or there may be more than two of each. The position of the diaphragm 3 and plate 7 may be reversed (the diaphragm being above the plate) without essential change of the device.

At 35 are shown caps of hand-holes by which access is had to the chambers 16.

The current of liquid may be reversed in the filter, if desired, in which case the unfiltered liquid would enter the vessel through pipe 23 and escape through pipe 21. This in some cases would have advantages, as the impurities might settle away from the diaphragms 3 4.

I claim as my invention—

1. The combination, in a filter, of a vessel having a fixed perforate diaphragm, 3, a perforate plate, 7, whose periphery fits the parallel sides of the vessel, (as a piston,) a tubular rod opening through and fixed to the plate, extending through packing in the end of the vessel, and means for adjusting said pipe vertically, substantially as and for the purpose set forth.

2. The combination of vessel 2, fixed perforate diaphragm 3, movable perforate plate 7, and tube 11, passing through packing in the end of the vessel and having a screw-threaded part on which works a nut, 14, substantially as and for the purpose set forth.

3. The combination of vessel 2, perforate fixed diaphragms 3 and 4, movable diaphragms or plates 7 and 8, tube 11, connected to the plates 7 and 8, a pipe, 21, a cock, 25, to open or shut off communication between the interior of the tube and the central chamber, 28, of the vessel, and a pipe in connection with the lower chamber of the cylinder.

4. In a filter, the combination, with a chamber and a pair of diaphragms located at suitable distances apart and supporting the filtering material, of a pipe extending through both diaphragms and having perforations communicating with the water-chamber between the two diaphragms, and a stop-cock for controlling said communication, substantially as set forth.

FRANK TREBAU.

In presence of—
SAML. KNIGHT,
BENJN. A. KNIGHT.